Figure 1:
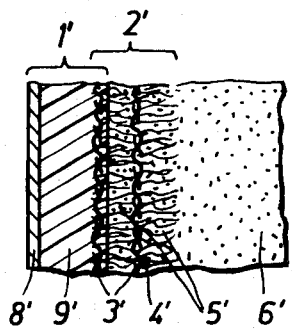

United States Patent [19]

Hoppe et al.

[11] 3,940,524
[45] Feb. 24, 1976

[54] ARTICLE COMPRISING FOAM PLASTIC COVERED WITH AN OUTER SURFACE STRENGTHENING LAYER

[75] Inventors: Peter Hoppe, Troisdorf; Gustav Drouven, Bensberg-Moitzberg; Helmut Leyer, Opladen; Johann Müller, Cologne, all of Germany

[73] Assignee: Bayer Aktiengesellschaft, Leverkusen, Germany

[22] Filed: May 28, 1974

[21] Appl. No.: 473,958

Related U.S. Application Data

[63] Continuation of Ser. No. 250,942, May 8, 1972, abandoned.

[30] Foreign Application Priority Data

May 14, 1974   Germany............................ 2123975

[52] U.S. Cl.................. 428/86; 264/257; 264/275; 264/45.5; 428/119; 428/304; 428/310
[51] Int. Cl.².......................................... B32B 5/18
[58] Field of Search............. 161/53, 159, 160, 154, 161/155, 156; 156/77, 78; 264/45, 257, 275; 428/86, 304, 310, 119

[56] References Cited
UNITED STATES PATENTS

| | | |
|---|---|---|
| 2,639,252 | 5/1953 | Simon et al............................ 264/45 |
| 2,870,793 | 1/1959 | Bailey................................... 264/45 |
| 2,948,651 | 8/1960 | Waag..................................... 161/53 |
| 3,591,444 | 7/1971 | Hoppe................................... 161/53 |

FOREIGN PATENTS OR APPLICATIONS

| | | |
|---|---|---|
| 1,050,346 | 12/1966 | United Kingdom................... 264/45 |
| 898,242 | 6/1962 | United Kingdom................... 264/45 |
| 927,526 | 5/1963 | United Kingdom................... 264/45 |

Primary Examiner—George F. Lesmes
Assistant Examiner—James J. Bell
Attorney, Agent, or Firm—Burgess, Dinklage & Sprung

[57] ABSTRACT

An article such as a structural member composed of a core of foamed material having bonded thereto for strengthening thereof, a laminate made up of an outer skin and a reinforcing insert. The reinforcing insert comprises at least one mat-loose fiber sheet combination with the mat disposed adjacent the skin and the loose fiber sheet disposed adjacent the foamed core. The material forming the skin penetrates from the skin, at least partially through the insert to an outer portion of the foamed core, and at least through the outermost mat so that the outermost mat is completely embedded in the material forming the skin.

10 Claims, 3 Drawing Figures

ARTICLE COMPRISING FOAM PLASTIC COVERED WITH AN OUTER SURFACE STRENGTHENING LAYER

This is a continuation of application Ser. No. 250,942, filed May 8, 1972, now abandoned.

BACKGROUND

This invention relates to reinforced foam plastic articles, preferably made of polyurethane foam, which are provided with a reinforcing insert which is joined to the foam.

The invention is an improvement in or a modification of structures such as for example those disclosed in U.S. Pat. No. 3,591,444.

Said patent provides an article comprising foam plastic covered with an outer surface layer and comprising adjacent to the outer surface layer, a zone of reinforced foam plastic, the reinforcement of which comprises a reinforcing insert, each insert being embedded in the foam plastics, each insert comprising at least one mat which is firmly united to at least one loose fibre structure, each mat being more compact than a loose fibre structure to which it is united, one insert being arranged so that a mat thereof is adjacent to the outer surface layer of the article.

In one embodiment of the invention the article is produced by foaming in a mould and the outer surface layer comprises a gel coat which is a binder that has been applied to the inner wall of the mould before foaming.

The outer surface layer may simply consist of the gelcoat or some other layer which has a layer of the gel coat applied to its internal surface. In either case the gel coat is only anchored to the reinforced foam plastic along the interface and possibly also via the reinforcing mat which has one side embedded in the layer of the gel coat.

THE INVENTION

It has now been found that the bond between the gel coat and the reinforced foam plastic and the transmission of force between the outer surface layer and the reinforced foam plastics can be substantially improved, to produce heavy duty articles having higher mechanical strength values, if at least one mat of the reinforcing insert is completely embedded in the gel coat. As a result of this deep anchoring of the reinforcing insert in the outer surface layer, the outer surface layer is itself capable of withstanding higher tensions and in addition the transmission of force to the core of the article is improved.

Accordingly the present invention provides an article comprising foam plastic covered with an outer surface layer and comprising adjacent to the outer surface layer, a zone of reinforced foam plastic, the reinforcement of which comprises a reinforcing insert embedded in the foam plastic, each insert comprising at least one mat which is firmly united to at least one loose fibre structure, each mat being more compact than a loose fibre structure to which it is united, one insert being arranged so that a mat thereof is adjacent to the outer surface layer of the article and in which the outer surface layer comprises at least one gel coat immediately adjacent to the zone of reinforced foam plastic, at least one mat of the reinforcing insert being embedded completely in the said gel coat. If the reinforcing insert comprises a number of mats and loose fibre structures, then it is preferred that several of the mats be embedded in the gel coat. Thus not only the mats, which may consist e.g. of woven fabrics, metal wire fabrics or lattices, but also one or more of the loose fibre structures may be completely penetrated by the gel coat. The risk of delamination of the mats or fabrics is thus eliminated and the internal rigidity of the articles produced are optimised.

It is preferred that the reinforcing insert comprises at least two mats with associated loose fibre structures and that at least two of the said mats be embedded in the gel coat.

It should be understood that the thickness of the reinforcing insert which is penetrated by the gel coat may vary in different parts of the article according to the variation in the severity of the stresses which are expected to be exerted on the various parts of the article.

The innermost loose fibre structure is preferably at least partly embedded in the gel coat. The advantage thus obtained is that this loose fibre structure is partly penetrated both by the gel coat and by the foam.

The gel coat is preferably an epoxy resin, polyester-resin or polyurethane coating.

Reference should be made to the U.S. Pat. No. 3,591,444 for the choice of materials for the mats and loose fibre structures.

Thus, the invention is directed to an article such as a structural member and the like having high static and dynamic strength values, and comprising a core of foamed material having bonded thereto at an outer portion thereof a bonded laminate. The bonded laminate is composed essentially of an outer skin and a reinforcing insert. The reinforcing insert comprises at the least one mat-fibre sheet combination with the mat disposed adjacent the skin and the loose fibre sheet disposed adjacent the foamed core. According to the invention the material forming the skin penetrates from the skin, at least partially through the insert to an outer portion of the foamed core and at least through the outer most mat so that the outer most mat is completely embedded in the material forming the skin. Preferably, the foamed core penetrates partially through the reinforcing insert.

In the reinforcing insert, the loose fibre sheet can be a random fibre fleece. Preferably fibers of the loose fiber sheet intermesh with the mat to firmly join the loose fibre sheet to the mat.

The accompanying drawings show sectional view of examples of articles according to the invention; in which FIG. 1 shows an article having a reinforcing insert composed of four layers, (two mats with two associated loose fibre structures)

Figure 2:
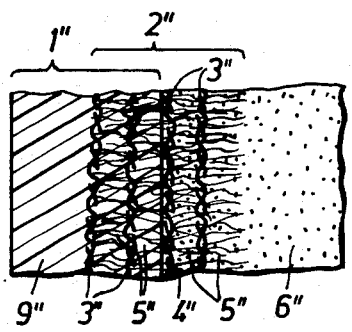
Figure 3:
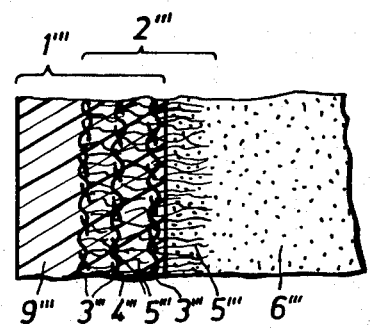

FIG. 2 shows an article having a reinforcing insert composed of eight layers 4 mats and 4 loose fibre structures, and FIG. 3 shows an article having a six-layered reinforcing insert, the innermost loose fibre structure of which is connected on one side to the gel coat layer.

In FIG. 1, the outer surface layer 1' consists of a metal foil 8' and a gel coat layer 9'. A reinforcing insert 2' is composed of two reinforcing mats 3' and two loose fibre structures 5'. Many of the fibres 4' of the fibre structure 5' are drawn through the reinforcing mats 3' by stitching so that the reinforcing insert 2' constitutes a single unit. The drawn through fibres can extend from one loose fibre structure 5' through the adjacent mat 3' into the other loose fibre structure 5', or into the other loose fibre structure 5' and into and through the other mat 3'. That reinforcing mat 3' which is directly adjacent to the outer surface layer 8' is completely embedded in the gel coat layer 9'. The other layers are penetrated by the foam plastics core 6'.

In FIG. 2, the outer surface layer 1'' consists of only one gel coat layer 9''. This layer is correspondingly thicker than that in the embodiment according to FIG. 1. It penetrates four layers of the reinforcing insert 2'', namely, the two reinforcing mats 3'' and two loose fibre structures 5''. Here again, the layers are united to form one unit by stitching of the fibres 4''. The hard foam plastics core 6'' penetrates four other layers of the reinforcing insert.

In FIG. 3, three layers of the reinforcing insert 3''' are embedded in the gel coat layer 9''' which constitutes the outer surface layer 1''', and the innermost layer of loose fibre structures 5''' is fixed on one side in the gel coat layer whilst the remainder is penetrated by foam.

What is claimed is:

1. In an article such as a structural member and the like having high static and dynamic strength values comprising a core of foamed material having bonded thereto at an outer portion thereof a bonded laminate composed essentially of an outer skin and a reinforcing insert comprising at least one mat-fiber fleece combination in which the mat and fiber fleece are joined so as to constitute a single unit, with the mat disposed adjacent the skin and the fiber fleece disposed adjacent the foamed core and the foamed core penetrating the fiber fleece, the improvement which comprises the material forming the skin penetrating from the skin, partially through the insert to an outer portion of the foamed core, and at least through the outermost mat so that the outermost mat is completely embedded in the material forming the skin.

2. The article of claim 1, the reinforcing insert comprising at least two mat-fiber fleece combinations joined together as a single unit, the material forming the skin penetrating at least through the two outermost mats so that the two outermost mats are completely embedded in the material forming the skin.

3. The article of claim 1 in which the material forming the skin penetrates partially through the innermost fiber fleece.

4. The article of claim 2 in which the material forming the skin penetrates partially through the innermost fiber fleece.

5. The articles according to claim 1, the material forming the skin being an epoxy resin, polyester resin or polyurethane resin.

6. The article according to claim 2, the material forming the skin being an epoxy resin, polyester resin or polyurethane resin.

7. The article according to claim 1, the core being polyurethane foam.

8. The article according to claim 2, the core being polyurethane foam.

9. The article according to claim 5, the core being polyurethane foam.

10. The article according to claim 6, the core being polyurethane foam.

* * * * *